United States Patent [19]

Paton et al.

[11] 4,273,985
[45] Jun. 16, 1981

[54] INTERNAL RESISTANCE PIPE BUTT WELDER

[76] Inventors: Boris E. Paton, ulitsa Chkalova, 41a, kv. 26, Kiev; Boris E. Scherbina, Kholzunov pereulok, 10, kv. 35, Moscow; Vladimir K. Lebedev, ulitsa Engelsa, 25, kv. 12, Kiev; Oleg M. Ivantsov, Aptekarsky pereulok, 98/2, kv. 23, Moscow; Sergei I. Kuchuk-Yatsenko, ulitsa Filatova, 1/22, kv. 47, Kiev; Vasily A. Sakharnov, ulitsa Solomenskaya, 41, kv. 93, Kiev; Boris A. Galian, ulitsa Lenina, 88/92, kv. 110, Kiev; Mikhail R. Unigovsky, ulitsa Pushkinskaya, 21, kv. 33, Kiev; Orest M. Serafin, ulitsa Dirizhabelnaya, 28, korpus 1, kv. 45, Dolgoprudny, all of U.S.S.R.

[21] Appl. No.: 36,166

[22] Filed: May 4, 1979

[30] Foreign Application Priority Data

May 4, 1978 [SU] U.S.S.R. .............................. 2625038

[51] Int. Cl.³ .................... B23K 11/04; B23K 37/04
[52] U.S. Cl. .............................. 219/101; 219/60 R; 219/66; 219/97; 219/116; 228/49 B
[58] Field of Search ............... 219/60 R, 66, 97, 100, 219/101, 104, 116; 228/44.5, 49 B

[56] References Cited

U.S. PATENT DOCUMENTS

| | | | |
|---|---|---|---|
| 1,303,964 | 5/1919 | Rietzel | 219/116 |
| 3,164,712 | 1/1965 | Paton et al. | 219/101 |
| 3,684,856 | 8/1972 | Lifshits et al. | 219/97 |
| 3,882,299 | 5/1975 | Sciaky | 219/97 X |
| 4,012,619 | 3/1977 | Lifshits et al. | 228/44.5 X |

FOREIGN PATENT DOCUMENTS

| | | | |
|---|---|---|---|
| 2201966 | 8/1972 | Fed. Rep. of Germany | 228/44.5 |
| 969248 | 9/1964 | United Kingdom | 219/97 |
| 414071 | 5/1974 | U.S.S.R. | 228/44.5 |

Primary Examiner—Elliot Goldberg
Assistant Examiner—Keith E. George

[57] ABSTRACT

A welder arranged inside pipes to be welded comprises a housing with the longitudinal axis thereof matched with the axis of the pipes. On the housing are a welding transformer and two mechanisms clamping the pipes, each having a drive moving the mechanism along the axis of the housing, and each being electrically connected to the transformer. The housing has mounted thereon a pipe flashing and upsetting mechanism with its own hydraulic drive, kinematically coupled to one of the pipe clamping mechanisms, a hydraulic pump supplying fluid to the drives, and a mechanism driving the welder along the pipes' axis. The housing carries two bearing discs secured at opposite ends and three clips mounted on roller supports and movable along the housing's axis. Two clips are incorporated in the first and second clamping mechanisms, respectively, and the third is part of the flashing and upsetting mechanism. The clip incorporated in the first pipe clamping mechanism is interposed between the bearing disc and the clip of the second clamping mechanism and is coupled to the bearing disc by means of its hydraulic drive. Another kinematic coupling is between this clip and the bearing disc. The clip of the flashing and upsetting mechanism is close to the second bearing disc and coupled thereto by its own hydraulic drive. The clip of the second clamping mechanism is interposed between the clip of the first clamping mechanism and that of the flashing and upsetting mechanism and is coupled to the clip of the flashing and upsetting mechanism by its hydraulic drive; and an additional kinematic coupling is between the clip of the second clamping mechanism and said clip of the flashing and upsetting mechanism.

14 Claims, 5 Drawing Figures

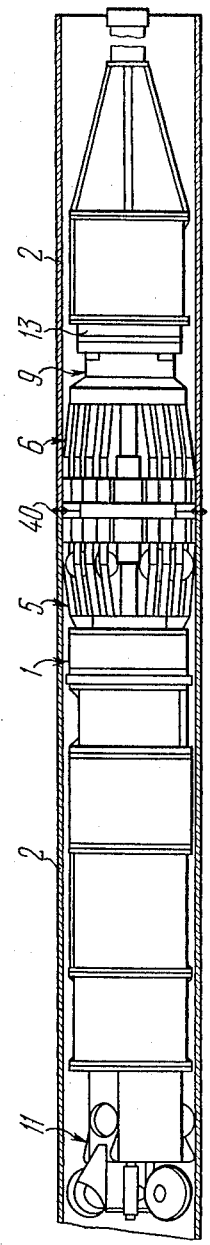
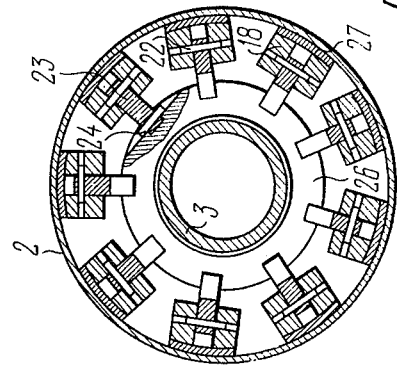
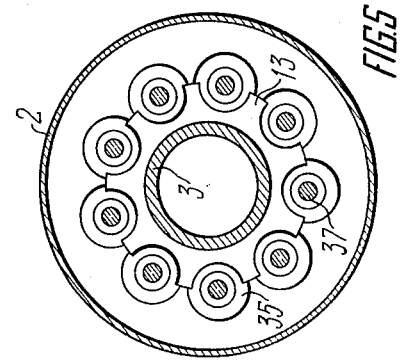

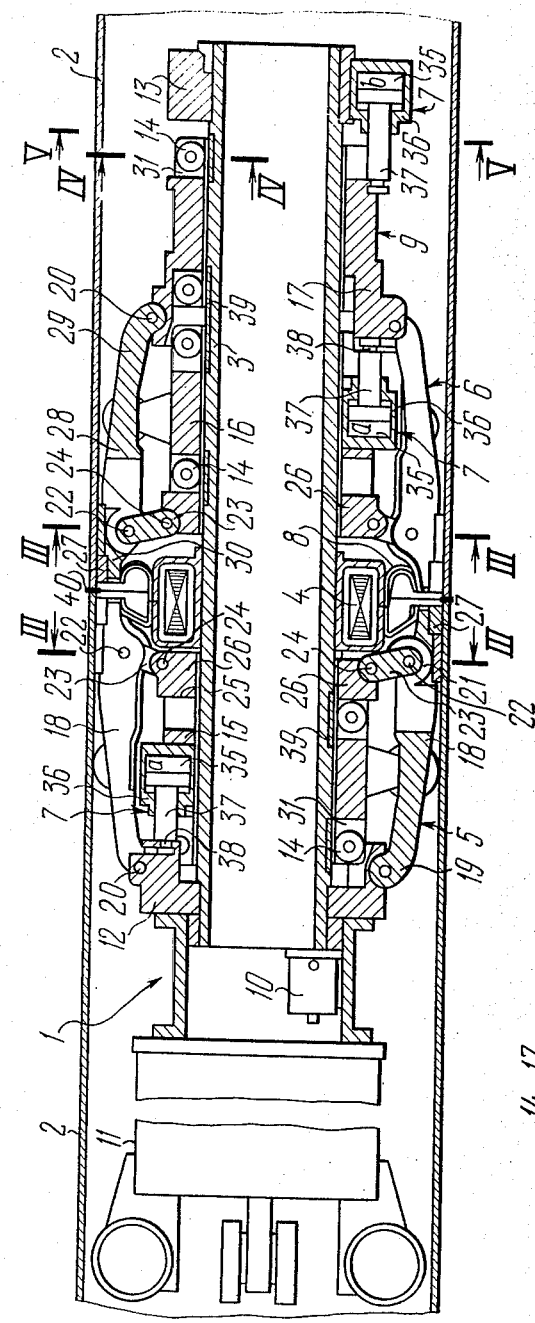
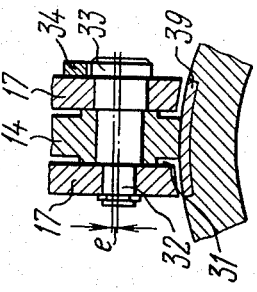
FIG.2
FIG.4

INTERNAL RESISTANCE PIPE BUTT WELDER

FIELD OF THE INVENTION

The present invention relates to resistance butt welding equipment and, more particularly, to resistance butt welders for circumferential butt welding of pipes.

The invention can be used in the field for laying oil and gas trunk pipelines and under factory conditions when welding large diameter pipes.

The existing resistance butt welders for butt welding of pipes fall into the following three categories:

(1) external welders, wherein all the mechanisms, including the welding transformers, are arranged outside pipes to be welded;

(2) internal welders, wherein all the mechanisms, including the welding transformers, are arranged inside pipes to be welded;

(3) combination welders, wherein the centering and upsetting mechanisms are accommodated in the welder, and the welding transformer and current-contact mechanisms are outside the pipe.

External welders are recommended for welding pipes of relatively small diameters. One would need a heavy and cumbersome external welder to weld large-diameter pipes. In the case of external welders, it is very difficult to inspect the butt joint.

Internal welders are recommended for welding large-diameter pipes both in the field and under factory conditions, when the welder is moved from one butt joint to another as in the case of laying a trunk pipeline. The size of an internal welder is restricted by the pipe diameter, thus good design and manufacture are imperative, especially with regard to the welding transformer and current-contact elements.

Combination welders are normally recommended for welding medium-diameter pipes under factory conditions. The mechanisms of such welders are found both inside and outside the pipe, wherefore these mechanisms and the weld are not easily accessible. The large size is another disadvantage of combination welders.

It can be inferred from the above considerations that internal machines are best for resistance butt welding of pipes of large diameter.

BACKGROUND OF THE INVENTION

There is known a welder for resistance butt welding of pipes, accommodated inside pipes to be welded (cf. U.S. Pat. No. 3,164,712 of Jan. 5, 1965).

The housing of this welder is a hollow bar whose longitudinal axis is matched with the axis of the pipes to be welded. Mounted on the housing in a coaxial arrangement are a welding transformer and mechanisms for clamping pipes to be welded, each being provided with a hydraulic drive to move the respective pipe clamping mechanism along the axis of the housing. The pipe clamping mechanisms are electrically connected to the welding transformer and located on its opposite sides. Also mounted on the housing is a pipe flashing and upsetting mechanism provided with a hydraulic drive of its own and kinematically coupled to one of the pipe clamping mechanisms. The housing also carries a hydraulic pump to supply working fluid to the hydraulic drives of the pipe clamping mechanisms and the pipe flashing and upsetting mechanism, as well as a mechanism for moving the welder along the axis of pipes to be welded.

The pipe clamping mechanisms of the welder under review are constructed as follows. The clip of each of the pipe clamping mechanisms is provided with slots to receive gripping jaws which are equidistantly arranged along the generatrix of the housing and driven out of their slots by the rod of a circular cylinder at the end of a cone-shaped ring. The gripping jaws come out of their slots as the cone-shaped ring contacts the chamfered internal surfaces of the jaws. The circular cylinder is made integral with the clip.

The foregoing design is disadvantageous in that the gripping jaws are frequently jammed by welding dribble or drippings which is unavoidable during resistance butt welding. Another disadvantage is that much of the force developed by the cylinder is lost because of the friction between the cone-shaped ring and the chamfered surfaces of the gripping jaws; as a result, the cylinder must be of a large size, although this makes it almost impossible to exclude leaks between the piston and the barrel of the cylinder. Finally, the cylinder is of the circular type, which necessitates sealing of the internal hole in the ring piston.

Much force is further lost because of the friction between the ring piston and its rod and the central bar. The manufacture of large-size circular cylinders with a number of seating surfaces is a labor-consuming and costly process.

The design of the clamping mechanism is such that after the gripping jaws are released they are brought back to the initial position only by gravity. On the other hand, it would be extremely difficult to build a special means for bringing the gripping jaws back to their initial position into a welder whose dimensions are restricted by the diameter of the pipe to be welded.

The pipe clamping mechanisms and the pipe flashing and upsetting mechanism of the welder under review all move with sliding friction on surfaces which are unavoidably exposed to dripping in the course of welding. The result is rapid wear and frequent jamming of these mechanisms.

The design of the clamping mechanism is such that the clips with the slots that receive the gripping jaws are unavoidably too close to the butt; this makes it impossible to arrange the welding transformer in the butt zone, which, in turn, accounts for an increased resistance of the welder's secondary circuit. The overall result is that welding is carried out at a high capacity and considerable power is consumed.

Finally, the welder incorporates high-accuracy, and is made of large-size parts. Naturally enough, such parts are difficult to manufacture.

SUMMARY OF THE INVENTION

It is a principal object of the present invention to provide a resistance butt pipe welder featuring high reliability in operation.

It is another object of the invention to provide a resistance butt welder of pipes, which is easier to manufacture than welders of conventional types.

The foregoing and other objects of the invention are attained by providing a resistance butt welder of pipes to be accommodated inside pipes to be welded, comprising: a housing having a longitudinal axis matched with the axis of the pipes to be welded; a welding transformer with two poles, mounted on said housing coaxially therewith; a first pipe clamping mechanism and a second pipe clamping mechanism, both mounted on said housing and electrically connected to said welding transformer; a pipe flashing and upsetting mechanism mounted on said housing and kinematically coupled to one of said pipe clamping mechanisms; two hydraulic drives, each intended to move the respective pipe clamping mechanism along the axis of said housing; a hydraulic drive for moving said pipe flashing and upsetting mechanism along the axis of said housing; a hydraulic pump mounted on said housing and intended to supply working fluid to said hydraulic drives of said pipe clamping mechanisms and said pipe flashing and upsetting mechanism; a mechanism to drive the welder along pipes being welded, mounted on said housing; bearing discs rigidly mounted at the opposite ends of said housing; three clips having end faces and mounted on said housing so as to be movable along the axis of said housing, whereof two are incorporated in said first and second pipe clamping mechanisms, respectively, whereas the third is incorporated in said pipe flashing and upsetting mechanism; said clip of said first pipe clamping mechanism being interposed between the nearer bearing disc and said clip of said second pipe clamping mechanism, and coupled to said bearing disc by means of said hydraulic drive of said first pipe clamping mechanism; said clip of said pipe flashing and upsetting mechanism being arranged close to the second bearing disc and coupled thereto by means of said hydraulic drive of said pipe flashing and upsetting mechanism; said clip of said second pipe clamping mechanism being interposed between said clip of said first pipe clamping mechanism and said clip of said pipe flashing and upsetting mechanism and coupled to said clip of said pipe flashing and upsetting mechanism by means of said hydraulic drive of said second pipe clamping mechanism; a kinematic coupling of said clip of said first pipe clamping mechanism to the nearer bearing disc; and another kinematic coupling of said clip of said second pipe clamping mechanism to said clip of said pipe flashing and upsetting mechanism.

It is expedient that the kinematic coupling of said clip of said first pipe clamping mechanism to the nearer bearing disc be of the type that comprises clamping levers equidistantly and symmetrically arranged in relation to the axis of said housing and having first ends and second ends facing towards said clip of said second pipe clamping mechanism; expansion levers having first ends and opposite second ends; a carrier ring rigidly mounted on that end face of said clip of said first pipe clamping mechanism, which is closer to said clip of said second pipe clamping mechanism; hinges intended to make said clamping levers pivotable in the radial direction and secure the first ends of said clamping levers on the nearer bearing disc; hinges to couple the second ends of said clamping levers to the respective ends of said expansion levers; hinges intended to make said expansion levers pivotable in the radial direction and secure the opposite ends of said expansion levers to said carrier ring; and clamp-type current-contact shoes mounted on the second ends of said clamping levers and connected to one of said poles of said welding transformer.

It is further expedient that the kinematic coupling of said clip of said second pipe clamping mechanism to said clip of said pipe flashing and upsetting mechanism be of the type that comprises clamping levers equidistantly and symmetrically arranged in relation to the axis of said housing and having first ends and second ends facing towards said clip of said first pipe clamping mechanism; expansion levers having first ends and opposite second ends; a carrier ring rigidly mounted on that end face of said clip of said second pipe clamping mechanism, which is closer to said clip of said first pipe clamping mechanism; hinges intended to make said expansion levers pivotable in the radial direction and secure the first ends of said clamping levers to said clip of said pipe flashing and upsetting mechanism; hinges to couple the ends of said clamping levers to the respective ends of said expansion levers; hinges intended to make said expansion levers pivotable in the radial direction and secure said opposite second ends of said expansion levers to said carrier ring; and clamp-type current-contact shoes mounted on the second ends of said clamping levers and connected to the opposite pole of said welding transformer.

One of the basic requirements imposed on a pipe welder is accurate centering of the pipe butts to be welded. In the welder of this invention, this requirement is met as follows. The carrier rings rigidly mounted on the clips of the pipe clamping mechanisms are moved together with these mechanisms by the respective hydraulic drives, whereby all the expansion levers are simultaneously turned through an equal angle and straightened out. This accounts for an equal stroke of the clamping levers equidistantly and radially arranged along the generatrices of the clips; concentrically with the longitudinal axis of the housing; when the pipe is clamped they move away from the center, and when the pipe is released they move towards the center, i.e. towards the longitudinal axis of the housing.

Unlike the advance motion of the clamping levers in welders of conventional types, the rotary motion of these levers in the welder of the invention makes it possible to dispense with guides for the clamping levers. This is an important improvement in view of the fact that the gaps between such guides and clamping levers of conventional welders are exposed to welding dribble. In the welder of the invention, the function of such guides is performed by the hinges which are fully protected from drippings. A free access to the clamping levers from all sides facilitates maintenance, whereas the use of the hinges accounts for an easy replacement of the levers.

It is desirable that the resistance butt welder of the invention be provided with roller supports to make said clips moveble along the axis of said housing.

It is advisable that the end faces of each of said clips be provided with slots spaced equidistantly and concentrically to the axis of said housing to receive said roller supports so that these are movable in the radial direction.

It is further advisable that said roller supports be installed in said slots with the aid of eccentric axles, each provided with a toothed flange at one of its ends, whose teeth interact with those of a respective rack mounted on the respective clip and intended to prevent slipping of said eccentric axle.

The adjustable roller supports account for less stringent accuracy requirements imposed upon the manufacture of the housing. The movability of the roller supports facilitates the manufacture of the welder and thus compensates for their wear in the course of operation.

It is highly advisable that the hydraulic drive of the clip of the first pipe clamping mechanism comprise a group of cylinders having their axes parallel to the longitudinal axis of the housing and symmetrically arranged around the housing, between said clip of said first pipe clamping mechanism and the nearer bearing disc, with the cylinders having their barrels rigidly secured to one of said two parts, and their rods being rigidly secured to the other of said two parts.

It is advisable that the hydraulic drive of the clip of the pipe flashing and upsetting mechanism comprise a group of cylinders having their axes parallel to the longitudinal axis of the housing and symmetrically arranged around the housing, between said clip of said pipe flashing and upsetting mechanism and that bearing disc which is closer to said clip, the cylinders having their barrels rigidly secured either to the clip or to the bearing disc, whereas their rods are rigidly secured to the other of said two parts.

It is preferable that the hydraulic drive of the clip of the second pipe clamping mechanism, interposed between the clip of the second pipe clamping mechanism and the clip of the pipe flashing and upsetting mechanism, comprise a group of cylinders having their axes parallel to the longitudinal axis of the housing and symmetrically arranged around the housing, between said clip of said second pipe clamping mechanism and said clip of said pipe flashing and upsetting mechanism, with the cylinders having their barrels rigidly secured to one of said two parts, and their rods being rigidly secured to the other of said two parts.

It is expedient that the barrel and rod of each cylinder of each hydraulic drive be provided with grooves and projections to match corresponding projections and grooves provided in the clips and bearing discs so as to rigidly secure said cylinders to said clips and said bearing discs.

The mounting of the cylinders on conjugate parts considerably facilitates assembly, as well as replacement of a faulty cylinder.

It is highly desirable that the external surface of the housing provided with heat-treated inserts to serve as guides for said roller supports of said clips.

The heat-treated inserts considerably reduce the wear of the roller supports, caused by their movement.

It is important that the welding transformer should be arranged so that the poles of its secondary winding are found opposite the butt joint being welded.

The arrangement of the welding transformer in the butt zone makes it possible to dispense with the necessity to insulate one half of the welder (or one pipe clamping mechanism) from the other, keeping in mind that the levers of the clamping mechanisms, the clips and the housing are parallel to the secondary circuit of the welder and are of a similar configuration; furthermore, a small distance between the transformer and the butt joint being welded accounts for a reduced length of the circuit through which current is supplied to the pipe, as well as narrower air gaps between the current-coolant elements of opposite signs, which, in turn, accounts for a reduced active and inductive resistance of the welder's secondary circuit. The overall result is a reduced power input for welding operations.

BRIEF DESCRIPTION OF THE DRAWINGS

Other objects and advantages of the present invention will become more apparent from a consideration of the following detailed description of a preferred embodiment thereof, taken in conjunction with the accompanying drawings, wherein:

FIG. 1 is a general external view of a resistance butt welder shown in a pipe to be welded and made in accordance with the invention;

FIG. 2 is a longitudinal sectional view of the resistance butt welder shown in FIG. 1;

FIG. 3 is a sectional view taken on line III—III of FIG. 2;

FIG. 4 is a sectional view taken on line IV—IV of FIG. 2; and

FIG. 5 is a sectional view taken on line V—V of FIG. 2.

DETAILED DESCRIPTION OF THE INVENTION

According to the invention, a resistance butt welder 1 of pipes, shown in FIGS. 1 and 2, is accommodated inside pipes 2 to be welded. The welder 1 comprises a housing 3 with the longitudinal axis thereof being matched with the axis of the pipes 2 to be welded. Mounted on the housing 3 in a coaxial arrangement are a welding transformer 4 and two pipe clamping mechanisms 5 and 6, each provided with a hydraulic drive 7 for moving the respective pipe clamping mechanism 5 or 6 along the axis of the housing 3.

The pipe clamping mechanisms 5 and 6 are both connected by flexible cables 8 to the transformer 4 and, if viewed in the longitudinal direction, are found on opposite sides of the transformer 4.

Also mounted on the housing 3, coaxially therewith, is a pipe flashing and upsetting mechanism 9 provided with a hydraulic drive 7 of its own and kinematically coupled to the pipe clamping mechanism 6. The housing 3 further carries a hydraulic pump 10 to supply working fluid to the hydraulic drives of the pipe clamping mechanisms 5 and 6 and to that of the pipe flashing and upsetting mechanism 9. Finally, the housing 3 carries a mechanism 11 which is intended to drive the welder 1 along the axis of the pipes 2.

According to the invention, two (first and second) bearing discs 12 and 13 respectively, are rigidly mounted at the opposite ends of the housing 3. Mounted on roller supports 14 and spaced along the longitudinal axis of the housing 3 are three clips 15, 16 and 17, with the clips 15 and 16 being incorporated in the pipe clamping mechanisms 5 and 6, respectively, and the clip 17 being incorporated in the pipe flashing and upsetting mechanism 9. The pipe clamping mechanism 5 is referred to below as the first pipe clamping mechanism 5, whereas the pipe clamping mechanism 6 is referred to as the second pipe clamping mechanism 6. The clip 15 of the first pipe clamping mechanism 5 is interposed between the welding transformer 4 and the first bearing disc 12 and is coupled to the clip by its hydraulic drive 7; it also has an additional kinematic coupling to the bearing disc 12. The clip 17 of the pipe flashing and upsetting mechanism 9 is arranged close to the second bearing disc 13 and is coupled thereto by means of its hydraulic drive 7. The clip 16 of the second pipe clamping mechanism 6 is interposed between the clip 17 and the welding transformer 4 and is coupled to the clip 17 by its hydraulic drive 7. The clip 16 has an additional kinematic coupling to the clip 17.

The kinematic coupling of the clip 15 of the first pipe clamping mechanism 5 comprises clamping levers 18 (FIG. 3) equidistantly and symmetrically arranged in relation to the longitudinal axis of the housing 3. First ends 19 (FIG. 2) of the clamping levers 18 are coupled by means of a cylindrical hinge 20, which makes them pivotable in the radial direction, to the bearing disc 12; and their opposite ends 21, facing towards the transformer 4, are each coupled by means of a cylindrical hinge 22 (FIG. 2) to the end of its respective expansion lever 23 (FIG. 2).

The opposite ends of the expansion levers 23 are secured by means of cylindrical hinges 24, which make them pivotable in the radial direction, on a carrier ring 26 (FIG. 3) which is rigidly mounted on an end face 25 (FIG. 2) of the clip 15, which is close to the welding transformer 4. The ends 21 of the clamping levers 18 carry clamp-type current-contact shoes 27 connected by the flexible cables 8 to one of the poles of the transformer 4.

The second pipe clamping mechanism 6 is of a similar design and differs from the pipe clamping mechanism 5 only in that its clamping levers 28 have their first ends 29 coupled by means of the cylindrical hinges 20 to the clip 17 of the pipe flashing and upsetting mechanism 9, whereas their opposite ends 30 are connected to the pole of the transformer 4 opposite to that where the levers 18 are connected.

The roller supports 14 are equidistantly spaced in two rows along the generatrix of the housing 3 and are received in slots 31 (FIG. 4) provided in the opposite end faces of the clips 15, 16 and 17. The roller supports 14 are pivotable about eccentric axles 32, and each is inserted in the slots 31 and carries a toothed flange 33 at one of its ends. The teeth of the toothed flanges 33 interact with those of racks 34 mounted on the clips 15, 16 and 17 and they are intended to prevent slipping of the axles 32.

Each of the hydraulic drives 7 of the clips 15, 16 and 17 is composed of groups of cylinders 35 (FIG. 5). In the embodiment under review, there are nine cylinders in each group. The axes of the cylinders 35 are parallel to the longitudinal axis of the housing 3, and the cylinders 35 are symmetrically arranged around the housing 3. Barrels 36 (FIG. 2) of the cylinders 35 are rigidly secured to the clips 15 and 16, whereas their rods 37 (FIG. 5) are rigidly secured to the bearing disc 12 in the case of the first pipe clamping mechanism 5, and to the clip 17 of the pipe flashing and upsetting mechanism 9 in the case of the second pipe clamping mechanism 6.

The barrels 36 of the cylinders 35 of the hydraulic drive 7 of the pipe flashing and upsetting mechanism 9 are rigidly secured to the bearing disc 13, while the rods 37 are rigidly secured respectively on the clip 17 of the pipe flashing and upsetting mechanism 9. The barrels 36 of the cylinders 35 are provided with projections which are received in grooves provided in the clips 15 and 16 and in the bearing disc 13; and the rods 37 of the cylinders 35 are provided with annular grooves 38 (FIG. 2) and are installed in seats provided in the bearing disc 12 and in the clip 17.

The external surface of the housing 3 is faced with heat-treated inserts 39, which serve as guides for the roller supports 14 of the clips 15, 16 and 17.

The ring welding transformer 4 is arranged so that the poles of its secondary winding are opposite to a butt joint 40 being welded. The longitudinal axis of the transformer 4 is matched with that of the housing 3 so that the transformer 4 is coaxial with the housing 3. The fact that the transformer 4 is right under the butt joint makes it unnecessary to insulate one half of the welder 1 from the other, keeping in mind that the arrangement of the individual components of the welder 1 corresponds to the secondary turn of the transformer 4. The foregoing arrangement of the transformer 4 also accounts for a reduced length of the secondary circuit of the welder, as well as the narrow air gaps between current-carrying busbars of opposite signs, which, in turn, accounts for a reduced active and inductive resistance of the welder's secondary circuit and helps to decrease the power input required for welding operations. In the course of assembly, the secondary turn of the transformer is tightly pressed against the massive housing 3 with its extended surface, which is an ideal way to cool the transformer and makes it possible to dispense with special cooling systems.

The resistance butt welder of the invention operates as follows. The mechanism 11 drives the welder along a completed portion of a pipeline until the front portion of the welder comes out of the pipeline so that the end of the pipeline is between the pipe clamping mechanisms 5 and 6, i.e. at the location of the butt joint 40 to be welded.

The supply and control cables are disconnected from the welder, and a pipe 2 to be welded is fitted over the front portion of the welder until it abuts against the end of the completed portion of the pipeline. The supply and control cables are then again connected to the welder. The electric drive of the hydraulic pump 10 is then put into action, and the working fluid is fed under pressure to the hydraulic system of the welder. The working fluid is first supplied to the cavities "a" of the cylinders 35 of the hydraulic drive 7 of the pipe clamping mechanism 5. The working fluid in the cavity "a" is under pressure and presses upon the bottoms of the barrels 36 of the cylinders 35 and upon the pistons of the rods 37. The rods 37 are rigidly secured to the bearing disc 12 which, in its turn, is secured to the housing 3; and as a result, the rods 37 remain fixed, whereas the barrels 36 of the cylinders 35 are set in motion and drive the clip 15 of the pipe clamping mechanism 15. The clip 15 is movable along the housing 3 on the roller supports 14 which roll on the inserts 39 provided on the housing 3.

The carrier ring 26 is rigidly mounted on the end face 25 of the clip 15 and moves together with the clip 15. The upper ends of the expansion levers 23 cannot be set in advance motion as the clip 15 and the carrier ring 26, but instead rotate about the hinge 24 secured in the ring 26. Thus, the expansion levers 23 change their angle in relation to the longitudinal axis of the housing 3 and drive the clamping levers 18 aside in the radial direction. As the levers 18 are brought to the walls of the pipe 2, the clamp-type current-contact shoes 27 come into contact with the internal surface of the pipe 2; and as the clip 15 and the ring 26 continue their motion, the clamping levers 18 clamp the pipe 2, straightening out the irregularities of its walls and extending it to a diameter equal to the diameter of a circle described around the shoes 27 of the clamping levers 18. The shape of the clamping levers 18 is that of a fish-bellied beam, so as the clamp-type current-contact shoes 27 are brought against the surface of the pipe, the levers 18 are deformable within the limit of elasticity of their material without loosing in strength due to clamping and upsetting and at the same time maintaining accurate centering.

The clip 15 and the carrier ring 26 are coaxial with the housing 3; and the levers 18 are all of an equal length. As a result, the expansion levers 23 are turned through an equal angle, whereby the clamping levers 18 are moved over an equal distance in the radial direction. Thus, the clamping mechanism 5 is a self-centering mechanism which adjusts the position of the welder so that it is coaxial with the pipe, i.e. the axis of the welder is matched with that of the pipe. When the expansion levers 23 are set at a perpendicular to the axis of the pipe, the pressure of the shoes 27 on the pipe 2 rises in a sinusoidal curve and tends to infinity. Theoretically, the result is that the force developed by the hydraulic drive may approach infinity due to the combined force developed by the hydraulic drive 7, disc 12, clip 15, ring 26, expansion levers 23 and clamping levers 18. This makes it possible to bring the diameters of pipes of different allowances to a prescribed diameter.

To summarize, the pipe 2 is clamped, and the axis of the welder is matched with that of the pipe.

The working fluid is then fed under pressure to the cavities "a" of the cylinders 35 of the hydraulic drive 7 of the clamping mechanism 6. The clamping of the second pipe 2 is done as described above, only in this case the rods 37 of the cylinders 35 of the hydraulic drive 7 abut against the clip 17 of the pipe flashing and upsetting mechanism 9, which clip 17, in turn, abuts against the bearing disc 13 mounted on the housing 3.

Thus, the second pipe is clamped, and its axis is matched with the axis of the welder earlier matched with that of the first pipe.

The matching of the axes means the matching of the walls of the pipes. At this point one may begin welding.

Power is supplied to the welding transformer 4 to be transformed and applied from the opposite poles of the transformer and through the flexible cables 8 to the respective clamp-type current-contact shoes 27 and, consequently, to the pipes 2. As this takes place, the working fluid is fed under pressure in small batches to the cavities "b" of the cylinders 35 where the barrels 36 are rigidly secured to the bearing disc 13. The working fluid presses upon the pistons of the rods 37 and drives them along the axis of the housing 3. The rods 37 are secured to the clip 17 of the pipe flashing and upsetting mechanism 9 so that the clip 17 and the pipe clamping mechansim 6 are driven by the rods 37. The pipe 2, clamped by the mechanism 6, is moved, too, so that its butt is gradually brought to that of the first pipe 2. It is precisely in the gap between the pipes 2 that a maximum electrical resistance is observed, which results in an intensive liberation of heat so that the ends of the pipes are flashed and reach the welding temperature.

As the welding temperature is reached, a large batch of the working fluid is directed into the cavities "b" of the cylinders 35 of the hydraulic drive 7 of the pipe flashing and upsetting mechanism. As a result, the butts of the pipes are rapidly brought together to squeeze the scale and molten metal out of the gap therebetween. At this point the power supply is cut off. The pipes are welded together. From the cavities "a" and "b" of all the cylinders 35, the working fluid is driven into the opposite cavities, and all the mechanisms are brought to the initial position.

The welder is now ready for a new welding cycle. The adjustable roller supports 14 ensure an easy going of the clips 15, 16 and 17 on the heat-treated inserts 39; they also help to compensate for the manufacturing defects of the housing 3, inserts 39, and clips 15, 16 and 17 and make it possible to set the clips so that they are strictly coaxial with the housing 3. In addition, by adjusting the roller supports 14, one can easily compensate for their own wear and for wear of the inserts 39.

The roller supports 14 are adjusted with the aid of a device presented in FIG. 4.

The roller supports 14 are rotatably mounted on the middle portion of the eccentric axle 32, which is eccentric with respect to the ends of the axle 32. The ends of the axle 32 are received in cylindrical holes provided in the projecting portions of the slots of the clip 17. At one of its ends, the eccentric axle 32 has the toothed flange 33 which interacts with the toothed rack 34, mounted on the clip 17, and thus prevents slipping of the axle 32. By moving the rack 34 out of engagement with the toothed flange 33, one rotates the flange 33 and the axle 32, whereby the roller supports 14 are moved closer to or away from the inserts 39. When the gap between the roller support 14 and insert 39 is eliminated and the axis of the clip 17 is matched with that of the housing 3, the eccentric axle 32 is again locked by the rack 34.

Of all the existing designs of resistance butt welders to be accommodated inside pipes being welded, only the presently disclosed welded device has been translated into reality, i.e. the welder of the invention has been actually produced and put into operation. As a rule, the welding of the truck pipelines is done manually. The quota of one workman is only 0.5 to 1 butt joint per shift, to say nothing of the fact that each workman needs 2 or 3 helpers. The welder of the invention ensures an 8- to 10-fold increase in productivity. According to field tests, the welder makes 5 to 7 joints per hour, while being serviced by a team of 11 men. The welder of the invention further mechanizes the entire welding process and thus improves the working conditions. It ensures welds of a strength equal to that of the base metal and thus considerably improves the durability of pipelines.

An important advantage of the welder of the invention resides in the fact that it moves inside the pipe, using it as a track. Thus, no special track is needed to transfer the welder from one point to another.

The complete automation of the welding process rules out faulty welds which otherwise may occur due to poor skill or fatigue of the workman.

A comparison of the welder of the invention with existing designs shows that the former is easier to manufacture, does not have to meet stringent accuracy requirements in the course of manufacture, and is quite compact, which makes it possible to save large amounts of metal. The low electrical resistance of the secondary circuit accounts for a much lower power input for welding operations. The low power input, in turn, makes it possible to reduce the size of the welding transformer, which means considerable saving of non-ferrous metals and transformer steel. For example, a ring transformer required only half of the amount of transformer steel which goes into the manufacture of an equivalent shell-type transformer.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A resistance butt welder adapted to be accommodated inside pipes to be welded for aligning a new pipe relative to a pipeline and forming a weld joint, comprising: a housing having a longitudinal axis matched with the axis of pipes to be welded; an annular welding transformer with first and second poles, mounted on said housing coaxially therewith and disposed inside said pipes and lying beneath the weld joint to be formed; a first pipe clamping mechanism and a second pipe clamping mechanism, both mounted on said housing and electrically connected to said welding transformer; a pipe flashing and upsetting mechanism mounted on said housing and kinematically coupled to one of said pipe clamping mechanisms; two hydraulic drives, each intended to move the respective pipe clamping mechanism along the axis of said housing; a hydraulic drive for moving said pipe flashing and upsetting mechanism along the axis of said housing; a hydraulic pump mounted on said housing and adapted to supply working fluid to said hydraulic drives of said first and second pipe clamping mechanisms and said pipe flashing and upsetting mechanism; a mechanism to drive the welder along the axis of pipes to be welded, mounted on said housing; first and second bearing discs rigidly mounted at the opposite ends of said housing; three clips having end faces and being mounted on said housing so as to be movable along the axis of said hosing, two of said clips are incorporated in said first and second pipe clamping mechanisms, respectively, whereas the third clip is incorporated in the pipe flashing and upsetting mechanism; said clip of said first pipe clamping mechanism being interposed between the welding transformer and the first bearing disc and is coupled to said first bearing disc by means of said hydraulic drive of said first pipe clamping mechanism; said clip of said pipe flashing and upsetting mechanism being arranged close to the second bearing disc and is coupled thereto by means of said hydraulic drive of said pipe flashing and upsetting mechanism; said clip of said second pipe clamping mechanism being interposed between said clip of said first pipe clamping mechanism and said clip of said pipe flashing and upsetting mechanism and is coupled to sid clip of said pipe flashing and upsetting mechanism by means of said hydraulic drive of said second pipe clamping mechanism; a kinematic coupling is disposed between said clip of said first pipe clamping mechanism and the first bearing disc; and a kinematic coupling is disposed between said clip of said second pipe clamping mechanism and said clip of said pipe flashing and upsetting mechanism.

2. A resistance butt welder as claimed in claim 1, wherein said kinematic coupling disposed between said clip of said first pipe clamping mechanism and the first bearing disc comprises clamping levers equidistantly and symmetrically arranged in relation to the axis of said housing and having first ends and second ends which face towards said clip of said second pipe clamping mechanism; expansion levers having first ends and opposite second ends; a carrier ring rigidly mounted on one end face of said clip of said first pipe clamping mechanism, which is closer to said clip of said second pipe clamping mechanism; hinges intended to make said clamping levers pivotable in the radial direction and secure the first ends of said clamping levers to the adjacently juxtaposed bearing disc; hinges to couple the second ends of said clamping levers to the respective ends of said expansion levers; hinges intended to make said expansion levers pivotable in the radial direction and secure the opposite ends of said expansion levers to said carrier ring; clamp-type current-contact shoes mounted on the second ends of said clamping levers and connected to one of the poles of said welding transformer.

3. A resistance butt welder as claimed in claim 1, wherein the kinematic coupling disposed between said clip of said second pipe clamping mechanism and said clip of said pipe flashing and upsetting mechanism comprises clamping levers equidistantly and symmetrically arranged in relation to the axis of said housing and having first ends and second ends which face towards said clip of said first pipe clamping mechanism; expansion levers having first ends and opposite second ends; a carrier ring rigidly mounted on one end face of said clip of said second pipe clamping mechanism, which is closer to said clip of said first pipe clamping mechanism; hinges intended to make said clamping levers pivotable in the radial direction and secure the first ends of said clamping levers to said clip of said pipe flashing and upsetting mechanism; hinges to couple the second ends of said clamping levers to the respective ends of said expansion levers; hinges intended to make said expansion levers pivotable in the radial direction and secure said opposite second ends of said expansion levers to said carrier ring; clamp-type current-contact shoes mounted on the second ends of said clamping levers and connected to the opposite pole of said welding transformer.

4. A resistance butt welder as claimed in claim 1, provided with roller supports so as to make said clips movable along the axis of said housing.

5. A resistance butt welder as claimed in claim 4, wherein the external surface of said housing is faced with heat-treated inserts to serve as guides for said roller supports of said clips.

6. A resistance butt welded as claimed in claim 4, wherein the end faces of each of said clips are provided with slots spaced equidistantly and concentrically to the axis of said housing and intended to receive said roller supports so as to make them movable in the radial direction.

7. A resistance butt welder as claimed in claim 6, wherein said roller supports are installed in said slots with the aid of eccentric axles, each having a toothed flange at one of its ends, whose teeth interact with those of a rack mounted on the respective clip and intended to prevent the respective eccentric axle from slipping.

8. A resistance butt welder as claimed in claim 1, wherein said hydraulic drive of said clip of said first pipe clamping mechanism comprises a group of cylinders having axes parallel to the longitudinal axis of said housing and which are symmetrically arranged around said housing, between said clip of said first pipe clamping mechanism and one of said bearing disc, and said cylinders having their barrels rigidly and said bearing discs so as to rigidly install said cylinders in said clips and said bearing discs.

9. A resistance butt welder as claimed in claim 8, wherein the barrel and rod of each cylinder of each of said hydraulic drives are provided with grooves and projections to match corresponding projections and grooves provided in said clips and said bearing discs so as to rigidly install said cylinders in said clips and said bearing discs.

10. A resistance butt welder as claimed in claim 1, wherein said hydraulic drive of said clip of said pipe flashing and upsetting mechanism comprises a group of cylinders having axes parallel to the longitudinal axis of said housing and which are symmetrically arranged around said housing, between said clip of said pipe flashing and upsetting mechanism and the bearing disc which is closer to that clip, and said cylinders having their barrels rigidly secured to one of said two parts, whereas their rods are rigidly secured to the other of said two parts.

11. A resistance butt welder as claimed in claim 10, wherein the barrel and rod of each cylinder of each of said hydraulic drives are provided with grooves and projections to match corresponding projections and grooves provided in said clips and said bearing discs so as to rigidly install said cylinders in said clips and said bearing discs.

12. A resistance butt welder as claimed in claim 1, wherein said hydraulic drive of said clip of said second pipe clamping mechanism comprises a group of cylinders having axes parallel to the longitudinal axis of said housing and which are symmetrically arranged around said housing, between said clip of said second pipe clamping mechanism and said clip of said pipe flashing and upsetting mechanism, and said cylinders having their barrels rigidly secured to one of said two parts, whereas their rods are rigidly secured to the other of said two parts.

13. A resistance butt welder as claimed in claim 12, wherein the barrel and rod of each cylinder of each of said hydraulic drives are provided with grooves and projections to match corresponding projections and grooves provided in said clips and said bearing discs so as to rigidly install said cylinders in said clips and said bearing discs.

14. A resistance butt welder as claimed in claim 1, wherein said welding transformer is arranged so that the poles of its secondary winding are opposite the butt joint being welded.

* * * * *